(12) United States Patent
Graf

(10) Patent No.: US 7,894,552 B1
(45) Date of Patent: Feb. 22, 2011

(54) ULTRA-EFFICIENT HARDWARE-BASED DECIMATION TECHNIQUE

(75) Inventor: Joseph T. Graf, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 804 days.

(21) Appl. No.: 11/879,457

(22) Filed: Jul. 16, 2007

(51) Int. Cl.
*H03D 1/00* (2006.01)

(52) U.S. Cl. .................. 375/340; 375/316; 375/326; 375/343; 375/324; 348/345; 348/180; 348/113

(58) Field of Classification Search ............... 375/340, 375/343, 316, 326, 324; 348/345, 180, 113
See application file for complete search history.

(56) References Cited

U.S. PATENT DOCUMENTS

| | | | |
|---|---|---|---|
| 5,878,088 A * | 3/1999 | Knutson et al. | 375/324 |
| 6,003,055 A * | 12/1999 | Kanazuka | 708/312 |
| 6,501,410 B1 * | 12/2002 | Kameda et al. | 341/155 |
| 7,010,059 B2 * | 3/2006 | Song et al. | 375/316 |
| 2003/0142760 A1 * | 7/2003 | Kim et al. | 375/326 |
| 2006/0269018 A1 * | 11/2006 | Li et al. | 375/343 |

* cited by examiner

*Primary Examiner*—Eva Y Puente
(74) *Attorney, Agent, or Firm*—Matthew J. Evans; Daniel M. Barbieri

(57) ABSTRACT

The present invention is directed to a quick, low-distortion and efficient reduction in sample rate requiring minimal logic. An IF signal is passed into an analog-to-digital converter. The converted signal is mixed with the combination of an in-phase and a quadrature component. The mixed signal is then split into an in-phase signal and a quadrature signal. The quadrature signal is interpolated to form a new signal aligned in time to the in-phase signal. Alternatively, the in-phase signal is interpolated to form a new signal aligned in time to the quadrature signal. The interpolation may comprise linear interpolation or parabolic interpolation. The simplified signal processing reduces the sample rate of the signal and the interpolation reduces aliasing introduced by the simplification. One advantage of this approach is that only half of the signal needs to be processed.

4 Claims, 5 Drawing Sheets

I sequence  $I_0$ 0 $I_2$ 0 $I_4$ 0 $I_6$ 0 $I_8$ ...

Q sequence  0 $Q_1$ 0 $Q_3$ 0 $Q_5$ 0 $Q_7$ 0...

ULTRA-EFFICIENT HARDWARE-BASED DECIMATION TECHNIQUE

FIELD OF THE INVENTION

The present invention relates generally to signal processing and more particularly to hardware-based decimation.

BACKGROUND OF THE INVENTION

In many software-defined radio (SDR) applications, such as Tactical Data Radio Systems (TDRS), there are significant portions of the waveform that reside in VHSIC (very-high-speed integrated circuit) hardware description language (VHDL). In many SDR applications, the portions of the waveform that reside in VHDL are implemented utilizing FPGA's (field-programmable gate array). As designs for SDR applications become more FPGA intensive, the capacity of designs may be limited by hardware resources, clock speeds, thermal requirements, etc. When the capacity of the design is limited, it is often critical to get the sample rate down quickly without requiring a lot of excess logic. Although the first stage of decimation (a technique for reducing the number of samples in a discrete-time signal) is traditionally provided by feeding an oversampled sequence into a CIC (cascaded integrator comb) filter, even this may require more logic than can be spared for a given application.

Referring generally to FIG. 1; the traditional breakdown of signal processing within a SDR application, as is known in the art, is illustrated. The intermediate frequency (IF) signal is fed into an analog-to-digital converter 101. The converted signal is separately mixed 104 and 105 with an in-phase component 102 and a quadrature component 103. The in-phase signal and quadrature signal are then separately filtered 106 and 107 and the sample rate of each is separately reduced 108 and 109. When the sample rate is related to the IF signal frequency such that $f_{if}$ is a factor of ¼ or ¾ for $f_s$, the mixer sequences simplify to a $\{1, 0, -1, 0\}$ sequence for the in-phase signal and a $\{0, -1, 0, 1\}$ or $\{0, 1, 0, -1\}$ for the quadrature signal. A representation of the quadrature mix is shown in FIG. 2.

Consequently, it would be desirable to provide a quick, low-distortion and efficient reduction in sample rate requiring minimal logic.

SUMMARY OF THE INVENTION

Accordingly, the present invention is directed to a quick reduction in sample rate requiring minimal logic.

An IF signal is passed into an analog-to-digital converter. The converted signal is mixed with the combination of an in-phase and a quadrature component. The mixed signal is then split into an in-phase signal and a quadrature signal. The quadrature signal is interpolated to form a new signal aligned in time to the in-phase signal. Alternatively, the in-phase signal is interpolated to form a new signal aligned in time to the quadrature signal.

The interpolation may comprise linear interpolation. The linear interpolation may be performed by passing the quadrature signal through a sample delay component, combining the delayed signal with the original signal, and shifting the combination to the right by one to effectively divide the result by two. Alternatively, the interpolation may comprise parabolic interpolation. The parabolic interpolation may be performed by passing the quadrature signal through a first sample delay component, passing the delayed signal through a second sample delay component, combining the signal with the result of the second delayed signal and the negative of the result of the first delayed signal to form a first combination, combining the signal with the negative of the result of the second sample delay component to form a second combination, shifting the first and second combinations, and combining the result of the first delayed signal with the first and second shifted combinations.

The simplification in combining in-phase and quadrature components and directly mixing with the real IF signal results in the absence of zeros from the sequence. This is an important step in optimization, as the zeros effectively carry no information. Although the zeros may not carry any information, they do provide a placeholder to keep the phase information intact. If the zeroes are thrown away (permanently), phase error is introduced into the sequence. This error is manifested as alias energy because the mix is no longer "perfect." As the information bandwidth increases relative to the sample rate, the amount of aliasing will likewise increase. However, by interpolating adjacent quadrature elements to form a new sample that aligns in time with the non-zero in-phase elements (or interpolating adjacent in-phase elements to form a new sample that aligns in time with the non-zero quadrature elements), the resulting phase error goes down.

The present invention provides a quick, low-distortion and efficient reduction in sample rates requiring minimal logic. The signal processing simplification reduces the sample rate of the signal and interpolation of either the in-phase signal or quadrature signal reduces aliasing introduced by the simplification. The interpolation may comprise linear interpolation. The interpolation may comprise parabolic interpolation, which greatly reduces aliasing introduced by the simplification with a minimal increase in complexity. One advantage of this approach is that only half of the signal (either the in-phase signal or the quadrature signal) needs to be processed. The present invention results in a "quick" reduction in sample rate with an improvement in quality over the simplification alone with very little combinational logic as compared to the already efficient CIC filters traditionally utilized. Such a simple reduction in sample rate can drastically influence downstream design as it may be challenged by the clock speed of the device, which impacts design and power consumption.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to exemplary embodiments of the invention, examples of which are illustrated in the accompanying drawings.

Figures 1, 2:
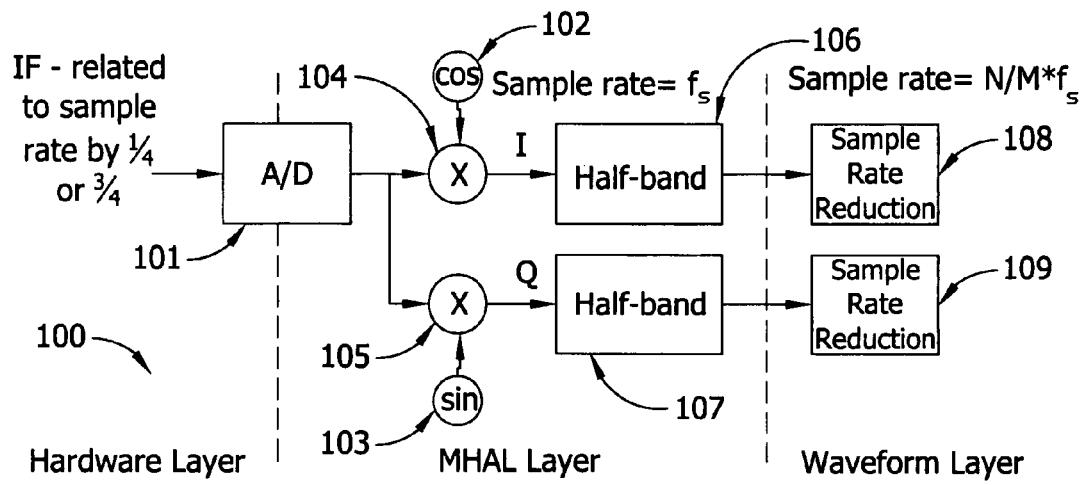
FIG. 1 is a block diagram illustrating the traditional breakdown of signal processing within a SDR application, as is known in the art.
FIG. 2 is a diagram illustrating a representation of the quadrature mix of a traditional breakdown of signal processing within a SDR application, as is known in the art.

Referring to FIG. 2, it can be seen that the quadrature mix of traditional breakdown of signal processing within a SDR application does not include cross products in the complex mix. Since there are no cross products in the complex mix, a simplification can be made.

Figure 3:
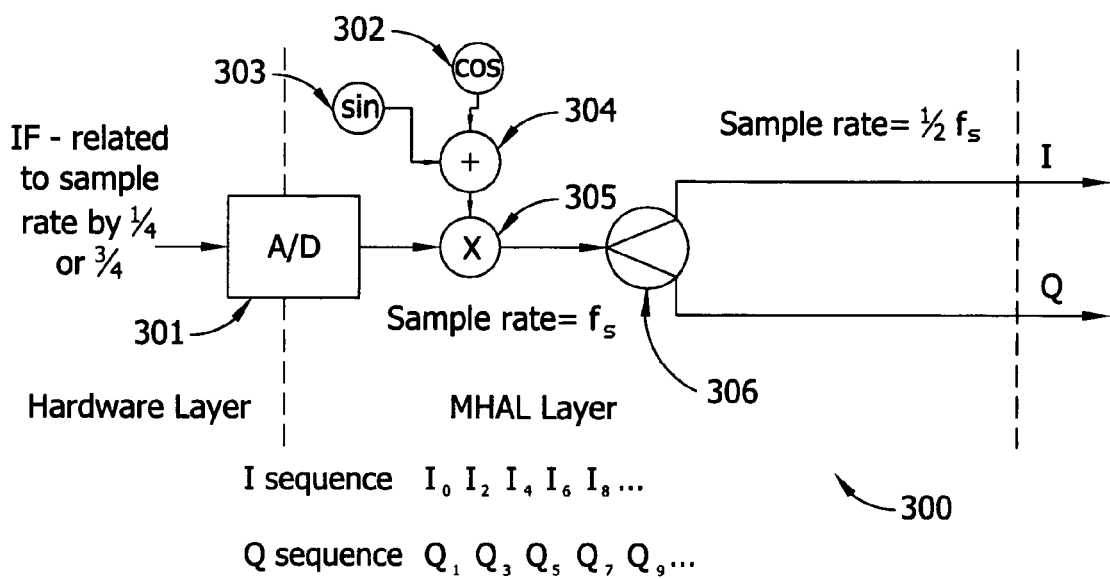
FIG. 3 is a block diagram illustrating a simplified breakdown of signal processing within a SDR application.

Referring now to FIG. 3, an intermediate frequency (IF) signal is fed into an analog-to-digital converter 301. The converted signal is mixed 305 with the combination 304 of an in-phase component 302 and a quadrature component 303. The combination 304 of the in-phase and quadrature components 302 and 303 (effectively) form a real stream $\{1, -1, -1, 1\}$ or $\{1, 1, -1, -1\}$ which is then directly mixed 305 with the real IF signal. This simplification results in the output of the mixer 305 represented by the sequence $(I_0, Q_1, I_2, Q_3)$. The zeros are absent from the sequence. This is an important optimization, as the zeros effectively carry no information. The zeros may be reinserted later, if desired. The mixed signal may then be split 306 into an in-phase signal and a quadrature signal, halving the sample rate of the mixed signal.

Although the zeros may not carry any information, they do provide a placeholder to keep the phase information intact. If the zeroes are thrown away (permanently) and that non-zero data grouped as shown in FIG. 3, phase error is introduced into the sequence. This error manifests as alias energy because the mix is no longer "perfect." As the information bandwidth increases relative to the sample rate the amount of aliasing will likewise increase.

However, if adjacent Q elements are "interpolated" to form a new sample that aligns in time with the non-zero I elements (or adjacent I elements are "interpolated to form a new sample that aligns in time with the non-zero Q elements), the resulting phase error goes down. The interpolation may comprise linear interpolation, parabolic interpolation, or any other curve-fit function that provides an interpolated result.

Figure 4:
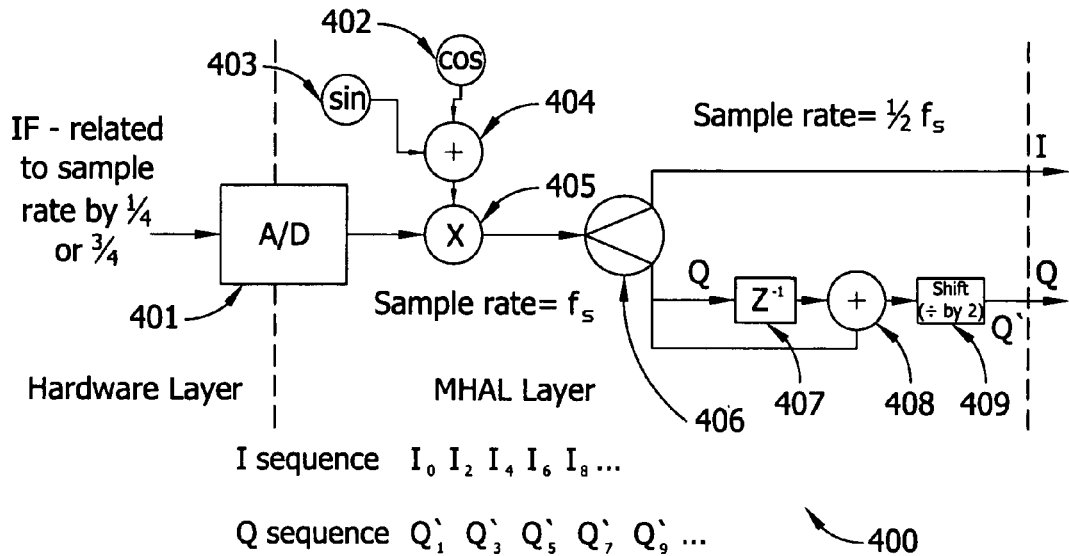
FIG. 4 is a block diagram illustrating a simplified signal processing within a SDR application utilizing linear interpolation to reduce aliasing, in accordance with an exemplary embodiment of the present invention.

Referring now to FIG. 4, a breakdown of signal processing, in accordance with an exemplary embodiment of the present invention, is illustrated. The IF signal is passed into an analog-to-digital converter 401. The converted signal is mixed 405 with the combination 404 of an in-phase 402 and a quadrature component 403. The mixed signal is then split 406 into an in-phase signal and a quadrature signal. The quadrature signal is interpolated by linear interpolation to form a new signal aligned in time to the in-phase signal. The linear interpolation may be performed by passing the quadrature signal through a sample delay component 407, combining 408 the delayed signal with the original signal, and shifting 409 the combination to divide the new sample by two.

Figure 5:
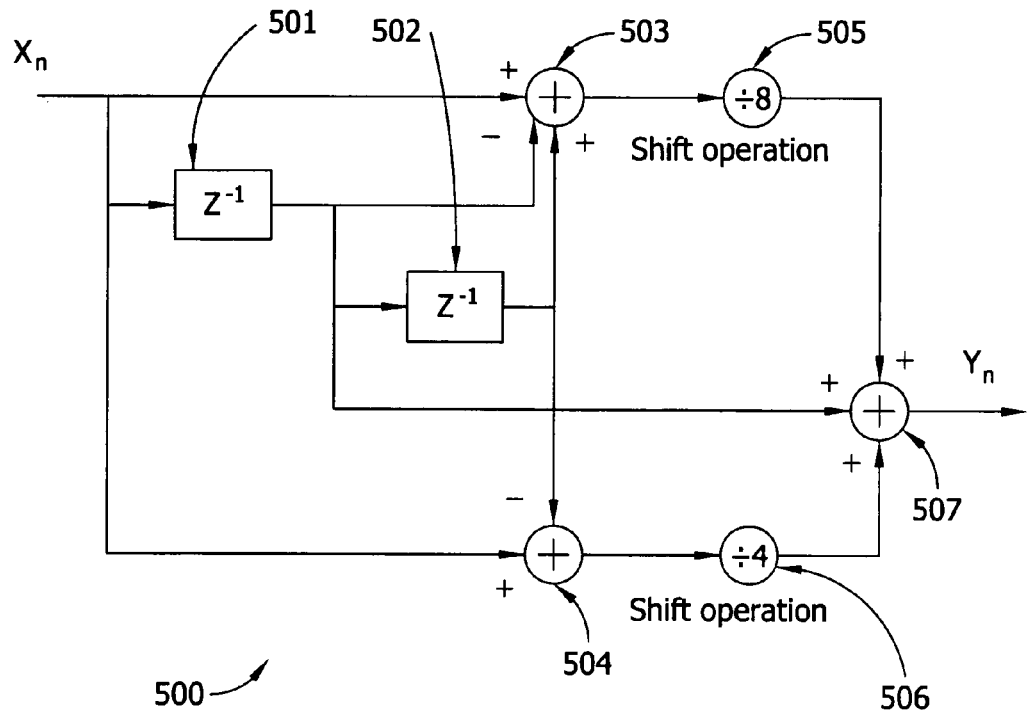
FIG. 5 is a block diagram illustrating parabolic interpolation for reducing aliasing in a simplified signal processing within a SDR application, in accordance with an alternative embodiment of the present invention.

Referring now to FIG. 5, in an alternative embodiment of the present invention, the quadrature signal may be interpolated by parabolic interpolation to form a new signal aligned in time to the in-phase signal rather than by linear interpolation. The parabolic interpolation may be performed by passing the quadrature signal through a first sample delay component 501, passing the delayed signal through a second sample delay component 502, combining 503 the signal with the result of the second delayed signal and the negative of the result of the first delayed signal to form a first combination, combining 504 the signal with the negative of the result of the second sample delay component to form a second combination, shifting the first and second combinations 505 and 506, and combining 507 the result of the first sample delay component with the first and second shifted combinations.

Alternatively, the in-phase signal may be interpolated by linear or parabolic interpolation to form a new signal aligned in time to the quadrature signal.

Figure 6:
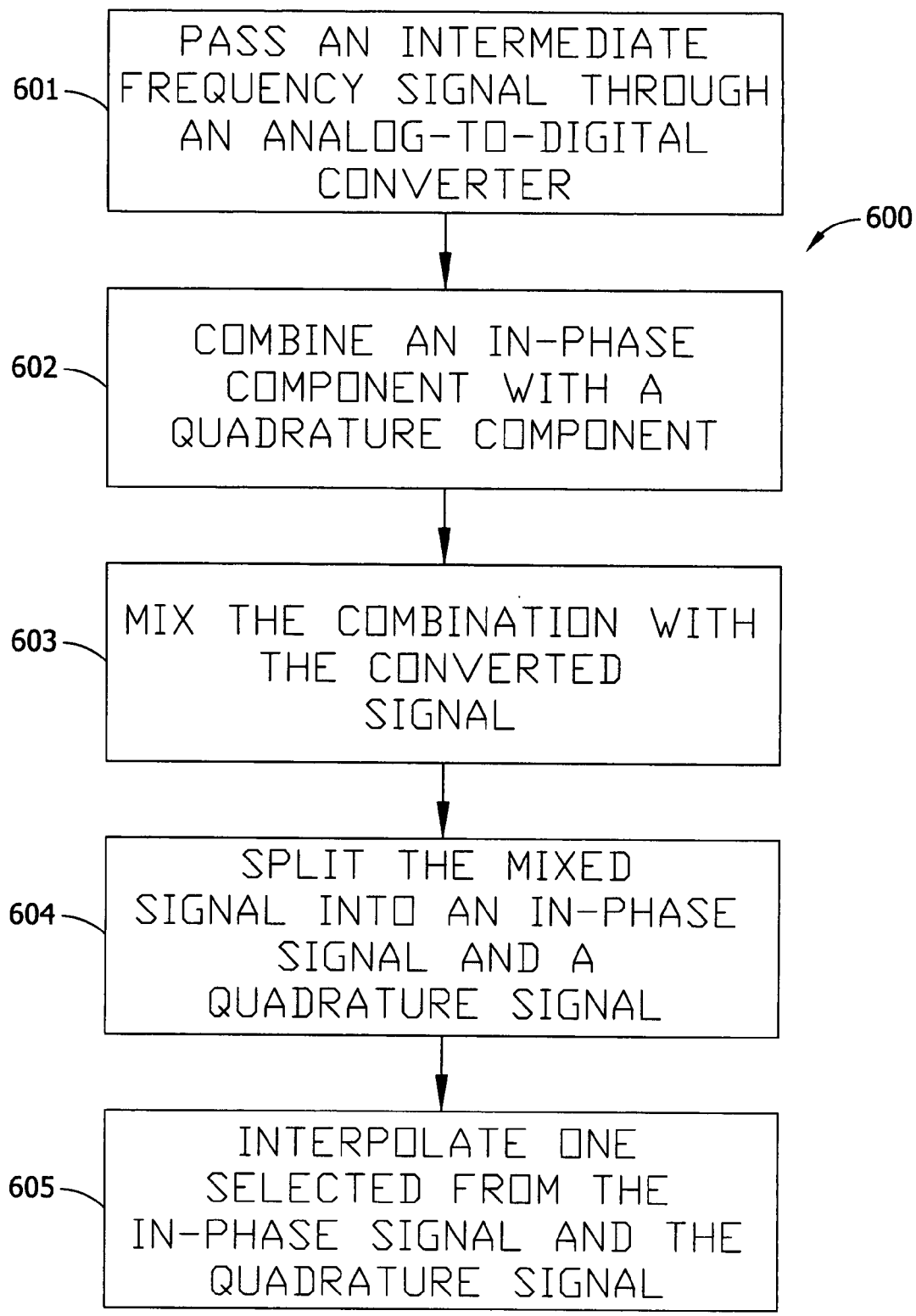
FIG. 6 is flow chart illustrating a method of decimation, in accordance with an exemplary embodiment of the present invention.

Referring now to FIG. 6, a method 600 of decimation, in accordance with an exemplary embodiment of the present invention, is shown. In step 601, a an intermediate frequency signal is passed through an analog-to-digital converter. In step 602, an in-phase component is combined with a quadrature component. In step 603, the combination is mixed with the converted signal. In step 604, the mixed signal is split into an in-phase signal and a quadrature signal. In step 605, either the in-phase signal or the quadrature signal is interpolated.

Figure 7:
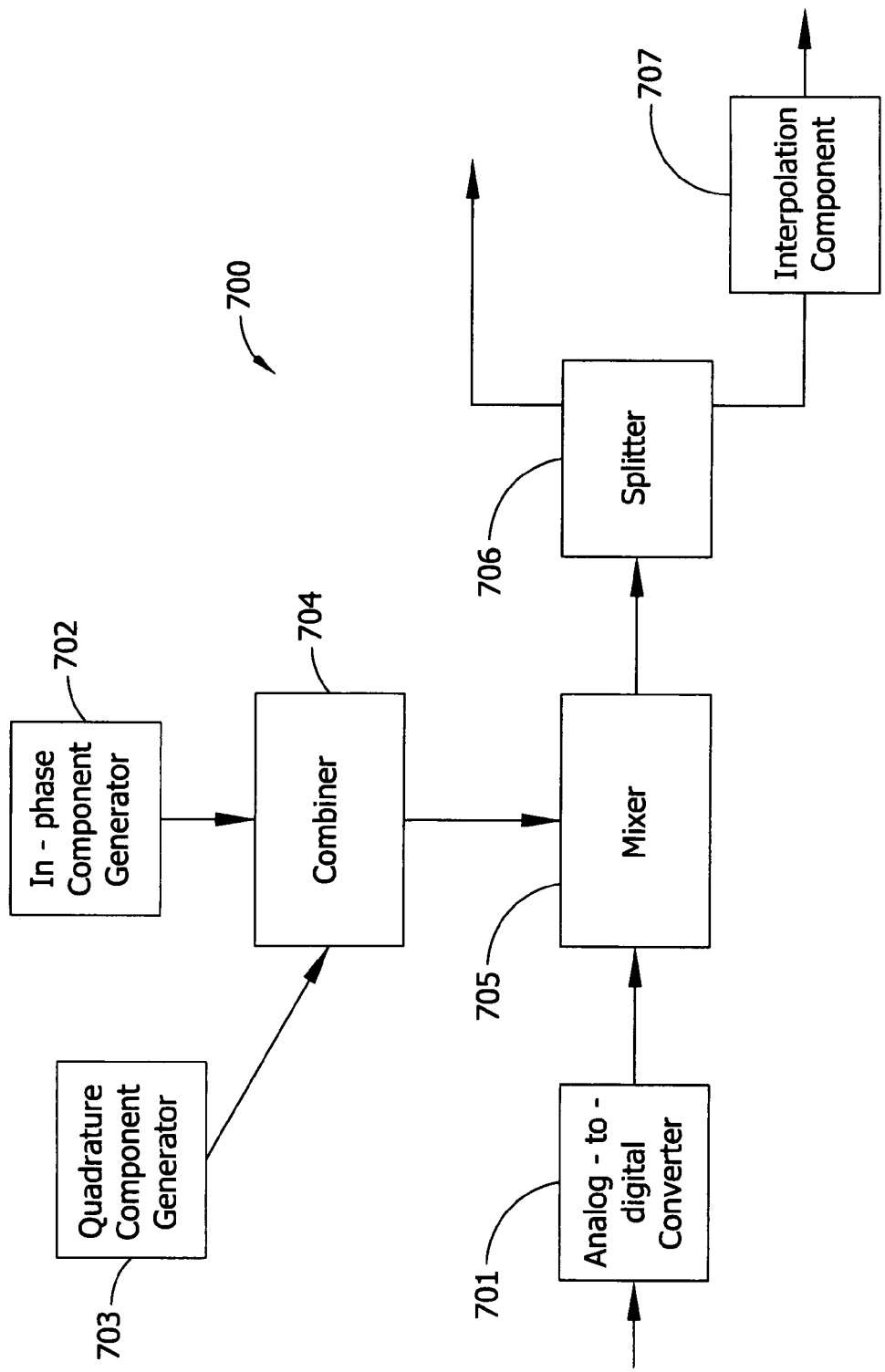
FIG. 7 is block diagram illustrating a system for decimating, in accordance with an exemplary embodiment of the present invention.

Referring now to FIG. 7, a system 700 for decimating, in accordance with an exemplary embodiment of the present invention, is illustrated. The system 700 comprises an analog-to-digital converter 701 for converting an IF signal, a combiner 704 for combining an in-phase component 702 with a quadrature component 703, a mixer 705 for mixing the combination with the converted signal, a splitter 706 for splitting the mixed signal into an in-phase signal and a quadrature signal, and an interpolation unit 707 for interpolating the quadrature signal to form a new signal aligned in time to the in-phase signal. The interpolation unit 707 may perform linear interpolation. The interpolation unit 707 may perform parabolic interpolation. Alternatively, the interpolation unit 707 may interpolate the in-phase signal to form a new signal aligned in time to the quadrature signal.

The present invention provides quick, low-distortion and efficient reduction in sample rates requiring minimal logic. The signal processing simplification reduces the sample rate of the signal and interpolation of either the in-phase signal or quadrature signal reduces aliasing introduced by the simplification. The interpolation may comprise linear interpolation. The interpolation may comprise parabolic interpolation, which greatly reduces aliasing introduced by the simplification with a very modest increase in complexity. One advantage of this approach is that only half of the signal (either the in-phase signal or the quadrature signal) needs to be processed. The present invention results in a "quick" reduction in sample rate with an improvement in quality over the simplification alone with very little combinational logic as compared to the already efficient CIC traditionally utilized.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A software defined radio, comprising:
an analog-to-digital converter for receiving an intermediate frequency signal;
a mixer operatively coupled to the analog-to-digital converter;
a combiner operatively coupled to the mixer;
an in-phase component generator and a quadrature component generator operatively coupled to the combiner;
a splitter operatively coupled to the mixer with an in-phase signal output and a quadrature signal output; and
an interpolation unit operatively coupled to one selected from the in-phase signal output of the splitter and the quadrature signal output of the splitter;
wherein the analog-to-digital converter converts the intermediate frequency signal, the combiner combines the in-phase component and the quadrature component, the mixer mixes the converted signal and the combination, the splitter splits the mixed signal into an in-phase signal and a quadrature signal, and the interpolation unit interpolates one selected from the in-phase signal and the quadrature signal,
wherein the interpolation unit comprises a parabolic interpolation unit, and wherein the parabolic interpolation unit comprises:
a first sample delay component for receiving one selected from the in-phase signal and the quadrature signal;
a second combiner for receiving the one selected from the in-phase signal and the quadrature signal, operatively coupled to the first sample delay component;
a third combiner for receiving the one selected from the in-phase signal and the quadrature signal;
a second sample delay component operatively coupled to the first sample delay component, the second combiner, and the third combiner;
a first shift unit operatively coupled to the second combiner;
a second shift unit operatively coupled to the third combiner; and
a fourth combiner operatively coupled to the first shift unit and the second shift unit;
wherein the first sample delay component delays the one selected from the in-phase signal and the quadrature signal by one sample, the second combiner combines the one selected from the in-phase signal and the quadrature signal with the negative of the delayed signal of the first sample delay component and the delayed signal of the second sample delay component, the third combiner combines the one selected from the in-phase signal and the quadrature signal with the negative of the delayed signal of the second sample delay component, the first shift unit shifts the combination of the second combiner, the second shift unit shifts the combination of the third combiner, and the third combination unit combines the delayed signal of the first sample delay component with the shift of the first shift unit and the shift of the second shift unit.

2. A method of decimation, comprising steps of:
passing an intermediate frequency signal through an analog-to-digital converter;
combining an in-phase component with a quadrature component;
mixing the combination with the converted signal;
splitting the mixed signal into an in-phase signal and a quadrature signal; and
interpolating one selected from the in-phase signal and the quadrature signal,
wherein the step of interpolating comprises parabolic interpolation, and
wherein the step of interpolating comprises:
passing the one selected from the in-phase signal and the quadrature signal through a first sample delay;
passing the first delayed signal through a second sample delay;
combining the one selected from the in-phase signal and the quadrature signal with the negative of the first delayed signal and the second delayed signal to obtain a first combination;
combining the one selected from the in-phase signal and the quadrature signal with the negative of the second delayed signal to obtain a second combination;
shifting the first combination;
shifting the second combination;
combining the shifted first combination with the shifted second combination and the first delayed signal.

3. A system for decimating, comprising:
an analog-to-digital converter for receiving an intermediate frequency signal;
a mixer;
a combiner;
an in-phase component generator;
a quadrature component generator;
a splitter with an in-phase signal output and a quadrature signal output; and
an interpolation unit;
wherein the analog-to-digital converter converts the intermediate frequency signal, the combiner combines the in-phase component and the quadrature component, the mixer mixes the converted signal and the combination of the in-phase component and the quadrature component, the splitter splits the mixed signal into an in-phase signal and a quadrature signal, and the interpolation unit interpolates one selected from the in-phase signal and the quadrature signal,
wherein the interpolation unit comprises a parabolic interpolation unit, and
wherein the parabolic interpolation unit comprises:
a first sample delay component for receiving one selected from the in-phase signal and the quadrature signal;
a second combiner for receiving the one selected from the in-phase signal and the quadrature signal;
a third combiner for receiving the one selected from the in-phase signal and the quadrature signal;
a second sample delay component;
a first shift unit;
a second shift unit; and
a fourth combiner;
wherein the first sample delay component delays the one selected from the in-phase signal and the quadrature signal, the second combiner combines the one selected from the in-phase signal and the quadrature signal with the negative of the delayed signal of the first sample delay component and the delayed signal of the second sample delay component, the third combiner combines the one selected from the in-phase signal and the quadrature signal the signal with the negative of the delayed signal of the second sample delay component, the first shift unit shifts the combination of the second combiner, the second shift unit shifts the combination of the third combiner, and the third combination unit combines the delayed signal of the first sample delay component with the shift of the first shift unit and the shift of the second shift unit.

4. A decimation device, comprising:

an analog-to-digital converter for receiving an intermediate frequency signal;

a mixer operatively coupled to the analog-to-digital converter;

a combiner operatively coupled to the mixer;

an in-phase component generator and a quadrature component generator operatively coupled to the combiner;

a splitter operatively coupled to the mixer with an in-phase signal output and a quadrature signal output; and an interpolation unit operatively coupled to one selected from the in-phase signal output of the splitter and the quadrature signal output of the splitter;

wherein the analog-to-digital converter converts the intermediate frequency signal, the combiner combines the in-phase component and the quadrature component, the mixer mixes the converted signal and the combination, the splitter splits the mixed signal into an in-phase signal and a quadrature signal, and the interpolation unit interpolates one selected from the in-phase signal and the quadrature signal, wherein the interpolation unit comprises a parabolic interpolation unit, and wherein the parabolic interpolation unit comprises:

a first sample delay component for receiving one selected from the in-phase signal and the quadrature signal;

a second combiner for receiving the one selected from the in-phase signal and the quadrature signal, operatively coupled to the first sample delay component;

a third combiner for receiving the one selected from the in-phase signal and the quadrature signal;

a second sample delay component operatively coupled to the first sample delay component, the second combiner, and the third combiner;

a first shift unit operatively coupled to the second combiner;

a second shift unit operatively coupled to the third combiner; and a fourth combiner operatively coupled to the first shift unit and the second shift unit;

wherein the first sample delay component transforms the one selected from the in-phase signal and the quadrature signal, the second combiner combines the one selected from the in-phase signal and the quadrature signal with the negative of the delayed signal of the first sample delay component and the delayed signal of the second sample delay component, the third combiner combines the signal with the negative of the delayed signal of the second sample delay component, the first shift unit shifts the combination of the second combiner, the second shift unit shifts the combination of the third combiner, and the third combination unit combines the delayed signal of the first sample delay component with the shift of the first shift unit and the shift of the second shift unit.

* * * * *